Dec. 30, 1958     K. J. SYLVEST     2,866,625
METHOD AND APPARATUS FOR COUNTER-CURRENT HEAT EXCHANGE
Filed Nov. 9, 1954     2 Sheets-Sheet 1

INVENTOR.
Karl J. Sylvest
BY
Pennie Edmonds Morton Barrows Taylor
ATTORNEYS

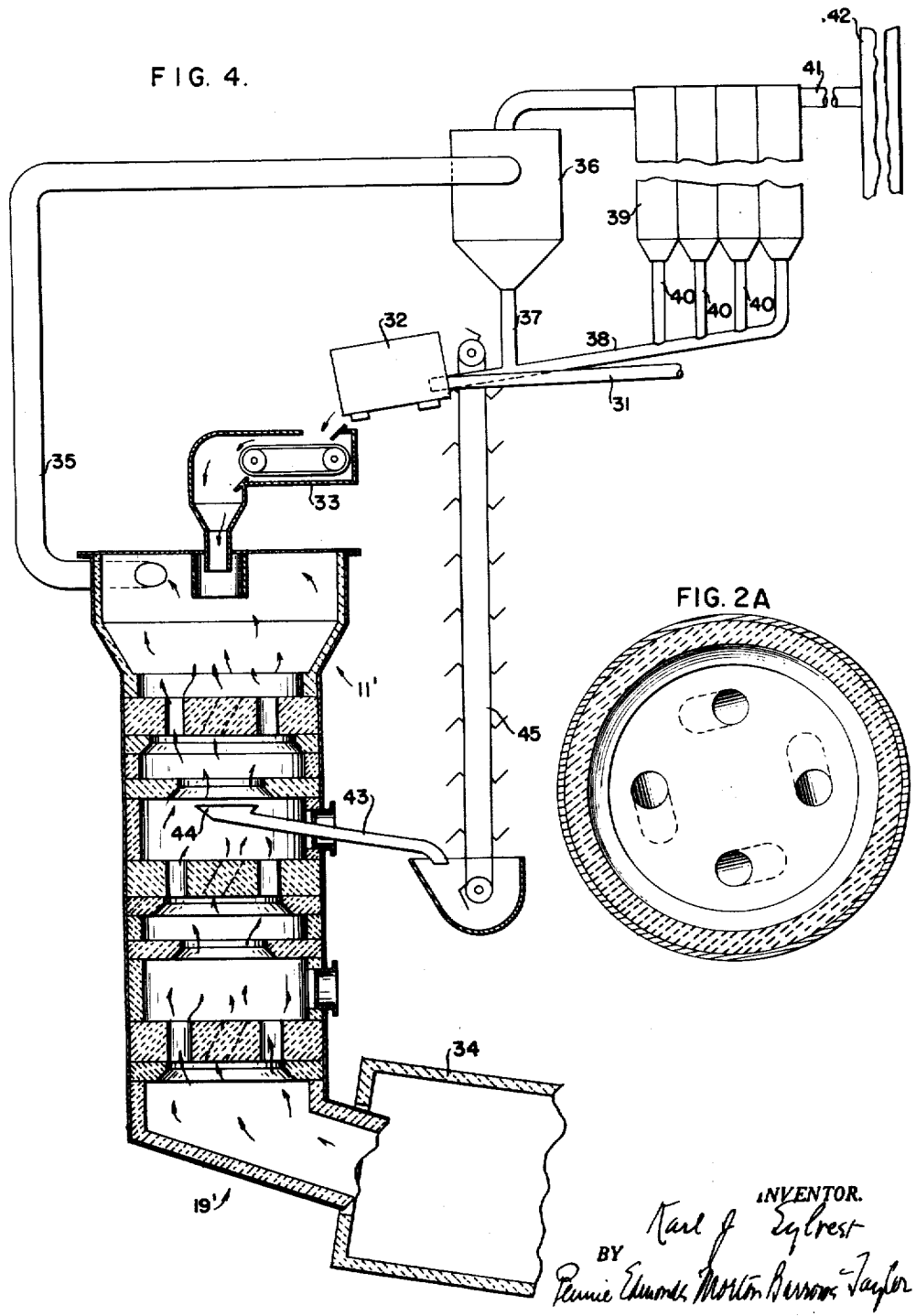

United States Patent Office 2,866,625
Patented Dec. 30, 1958

2,866,625

METHOD AND APPARATUS FOR COUNTER-CURRENT HEAT EXCHANGE

Karl J. Sylvest, Copenhagen, Denmark, assignor to F. L. Smidth & Co., New York, N. Y., a corporation of New Jersey Application November 9, 1954, Serial No. 467,843

Claims priority, application Great Britain November 9, 1953

5 Claims. (Cl. 257—55)

This invention relates to methods and apparatus for heat exchange between solids and gases and is concerned more particularly with a novel method for the exchange of heat between a gas and a finely divided material, the particles of which are freely movable in the gas and have a size not exceeding a few millimeters in diameter. The new method makes possible prolonged contact between the gas flowing in an upward direction and the particles traveling downward through the gas stream and thus provides excellent heat exchange with a relatively short path of gas flow. The desired result is obtained by feeding the particles into the gas stream to fall therethrough by gravity and then intermittently checking their flow either by varying the velocity of the gas flow or by intercepting the particles mechanically. The invention includes apparatus, by which the method may advantageously be practiced.

Heat exchange between a finely divided material and a gas is frequently carried out by introducing the material into a stream of the gas to be carried along thereby, the particles then being separated from the stream in a cyclone or other separating apparatus. In such a process, the heat exchange occurs during the concurrent flow of the particles with the gas and the temperature gradients in such an apparatus are high, so that the time required for the heat exchange is low. However, difficulties are encountered in such a process in separating the particles from the gas when the material contains a large proportion of fine particles, for example, 40% less than $2\mu$, since such particles can be removed from the gas stream only by the use of a large cyclone or dust separators of large area. Also, if the particles are hot, they are liable to adhere to the surfaces of the separating equipment and clog it.

The method of the invention involves counter-current flow of the particles and gas and, as is known, it is possible in such counter-current processes to obtain complete heat exchange in a single stage. In the practice of the new method, the travel of the particles through the gas stream is intermittently checked, so that the contact between the gas and particles is prolonged and the desired heat exchange can take place in a gas stream, which is not of undue length.

The method of the invention may be employed in various applications, such as the burning of lime or ores, but it is particularly useful in the manufacture of cement, in which it may be applied to any of the stages of drying, preheating, calcining, sintering, and cooling, which occur in cement manufacture. If the method is employed for heating purposes, the hot gases may be the products of combustion from any process, to which the particles are subjected, as, for example, the hot gases may be from a kiln, in which the particles are burned. The gases from a rotary kiln may have a temperature of about 1000° C. and the particles may be heated nearly to this temperature. If it is desired to heat the particles to higher temperatures, the gases for the purpose may be produced in a separate combustion chamber.

The particles treated may be as small as $50\mu$ or substantially larger, for example, up to about 5 mm. in diameter. In the latter case, the particles may advantageously be nodules having an average diameter of 0.5 to 2.5 mm. Such nodules are considerably smaller than those commonly used heretofore in cement practice and the treatment of these small nodules is an important feature of the invention.

The treatment of particles in nodular form has the advantage that such nodules have less tendency than fine particles to stick to the surfaces of the apparatus, such as the devices employed in checking the downward flow of the nodules. The nodules are slightly moist with an average water content, which may be about 12%, and they thus tend to collect and hold extremely fine particles or dust in the gas. As there is less dust in the nodular material than in the material not nodulized, the use of nodules reduces the amount of dust carried along with the gas and requiring separation therefrom.

The particles under treatment should in all cases be as nearly as possible of the same size, whether the material has been nodulized or not. Accordingly, it is desirable in some instances to grind the raw material, separate it into two fractions at $50\mu$ diameter, for example, and then nodulize the fine fraction and add the nodules to the coarse fraction for heat treatment. If the powdered material to be treated consists initially of a mixture of fine and coarse particles, it may be moistened before its introduction into the gas stream to give it a moisture content of up to about 10% and the moisture will then bind the extremely fine particles. The moistening may be effected by spraying a mist of water on a traveling layer of the raw material.

The rate of fall of very fine particles in an upwardly moving gas stream is likely to be very low, but it has been found that, when particles in large quantities are suspended in the gas, the rate of fall increases. As the number of particles per unit volume of the gas is increased, the particles no longer behave as individual particles, but somewhat like a body moving as a whole and relatively rapidly through the gas. Particles which average from 0.5 to 2.5 mm. in diameter tend to move less as a body than finer particles, since, with the larger particles, there are fewer individual particles in a given weight per unit volume. However, the larger particles fall faster than the smaller ones, in any event.

Heat exchange between an upwardly flowing gas stream and particles traveling downwardly through the stream may require a long path of gas travel in order to enable the particles to attain approximately the initial temperature of the gas. In practice, the amount of the gas available is usually determined by considerations other than those of heat exchange and to work with the volume of gas available may require a path of gas flow of unreasonable height, if the flow is through a plain cylindrical shaft. Accordingly, whatever the size of the particles and their rate of fall through the gas, it is necessary that they remain in contact with the gas for sufficient time to effect the desired heat exchange and, in the practice of the new method, the period of contact of the downward flow of the particles. Such periodic gas and particles is prolonged by intermittently checking retarding of the movement of the particles makes it possible to practice the process in a shaft, which is not objectionably long. The checking of the fall of the particles may be done by alternately increasing and decreasing the velocity of flow of the gas or by mechanical means, the former expedient being preferred.

For a better understanding of the invention, reference may be made to the accompanying drawings, in which Fig. 1 is a diagrammatic view in side elevation of an installation, in which the heat exchange apparatus of the invention is employed;

Fig. 2A is a horizontal sectional view on line 2a—2a of Fig. 2 looking in the direction of the arrows;

Fig. 4 is a diagrammatic view, partly in elevation and partly in section of another installation, in which the heat exchange apparatus of the invention is employed.

Figure 1:
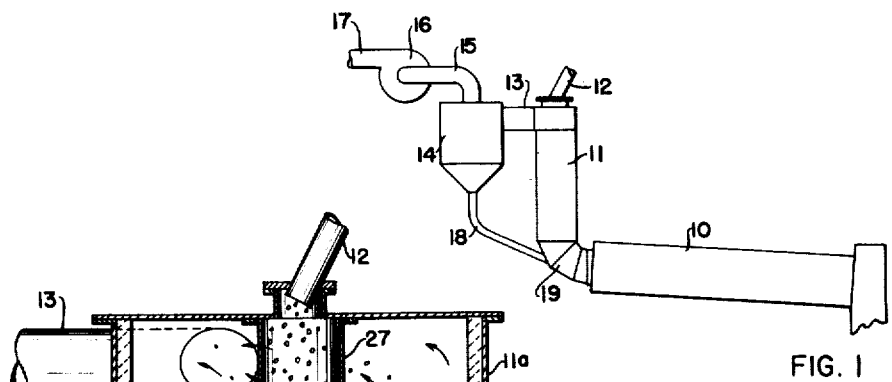

The installation shown in Fig. 1 may be part of a cement plant, in which nodules of raw material are to be burned in a rotary kiln 10 of conventional form. The gases from the kiln are led into the lower end of a vertical shaft 11, in which the gases move upwardly counter-current to nodules, which are introduced into the upper end of the shaft through a pipe 12 and an inlet valve not shown. The gases leaving the shaft travel through a pipe 13 to a cyclone 14, from which the gases are drawn through a pipe 15 to the intake of a blower 16 having its exhaust pipe 17 leading to a stack. The fine material separated from the gas in cyclone 14 is conducted by pipe 18 into the connection 19 between the kiln and shaft 11 and the separated material together with the nodules preheated in shaft 11 enters the feed end of the kiln.

The shaft 11 includes a metallic shell 20 with a refractory lining 21 and is provided with means for intermittently checking the fall of the nodules therethrough. For this purpose, a plurality of partitions 22 are mounted to extend across the shaft and the partitions have openings therethrough in the form of passages 23. The passages 23 preferably decrease in diameter in successive partitions upwardly through the shaft so that, as the gas cools and its volume decreases, it will flow at substantially the same speed through the passages in all the partitions.

Figure 2:
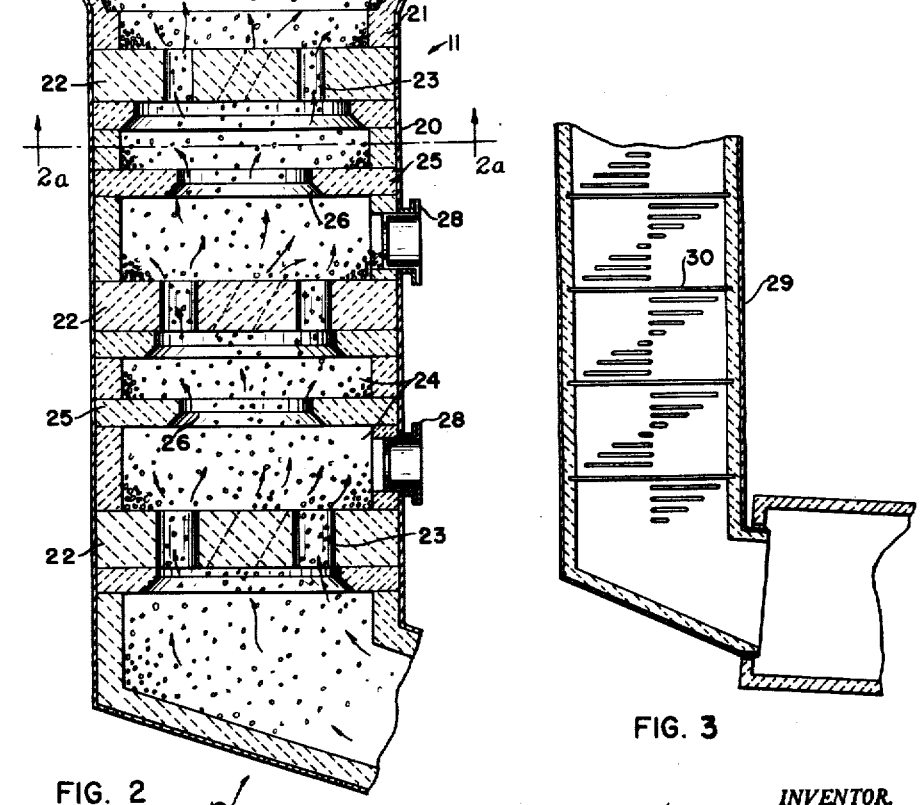
Fig. 2 is a vertical section through one form of the new heat exchange apparatus.
Figure 3:
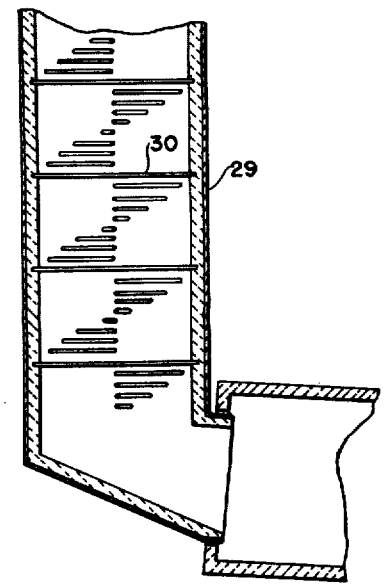
Fig. 3 is a vertical section through another form of the apparatus.

Adjacent partitions 22 are separated by spaces 24 and each of these spaces is subdivided by a transverse partition 25 having a central opening 26. As the gas flows upwardly through shaft 11, the speed of the gas increases as it travels through the passages 23 and, on leaving these passages, the gas stream becomes turbulent and its upward speed decreases. The passages 23 are inclined to the axis of the shaft as indicated in Figs. 2 and 2A so that the gases leaving the passages will be caused to whirl in each space 24. As the openings 26 through partitions 25 are of less cross-sectional area than the spaces 24, the velocity of the gas will be increased as it travels through the openings.

The speed of the gas traveling through each of the passages 23 may be much greater than is required to keep the nodules in suspension in the gas, so that it might appear that no nodules would travel downward through the passages. However, as the nodules are fed into the top of the shaft through the conduit 12 and pass through the tubular partition 27 in the upper end of the shaft, they accumulate above the upper ends of the passages 23 until the gas appears to be locally saturated, whereupon some of the nodules will move through the passages as a body despite the high velocity of the gas flow in the opposite direction. Once the downward flow of the nodules as described has begun, it is continuous, although, before any individual nodule enters the passage 23, it is carried about the turbulent gas above the opening and excellent heat exchange is obtained.

The speed of the gas through the passages 23 may be from 3 feet to 30 feet per second depending upon the nature of the particles, and the speed of the gas through the spaces 24 may be ¼ to ⅕ of that through the passages. The apparent density of the material in the spaces 24 should not exceed 1.5 lbs. per cubic feet, and, when the material is in the form of small nodules of a size from 0.5 to 2.5 mm. diameter, a suitable density is 0.06 lbs. per cubic foot. The density of the material traveling through passages 23 should be 4 to 5 times the density of the material in the spaces 24.

It has been found that, in the practice of the method, there is a sharp separation between particles, which pass down through the gas stream, and those, which are carried off in the gas, and the removal of the fine particles enables the coarse ones to flow through the shaft with less tendency to form blocks or bridges. The particle size, at which the separation takes place, depends on the gas velocity and may be such that, in treating nodules of a maximum size of 2 mm., for example, particles over 0.5 mm. and amounting to 75% of the total pass downward, while particles under 0.5 mm. including dust and broken nodules and amounting to about 25% of the total are carried off.

In the practice of the process, heaps of nodules accumulate on the partitions 22 around the openings into passages 23 and such nodules may be left undisturbed for considerable periods. From time to time, it is desirable to remove the accumulated nodules and, for this purpose, clean-out doors 28 are provided in the wall of the shaft above partitions 24.

The shaft 11 may be used for other purposes than preheating, since complete calcining, sintering, or roasting of cement raw materials, lime and lime products, or ores may be effected within the shaft by the use of gases of proper temperature. The production of such gases requires a separate combustion chamber, from which the gases are led into the shaft through a connection resembling connection 19. The shaft need not be employed merely for heating purposes, since it is possible to cool burned materials by the use of a cool gas stream traveling upward counter-current to the hot solids flowing down through the shaft. The air for cooling is heated during the cooling process and may be employed for any suitable purpose, such as secondary air of combustion.

The top section 11a of the shaft has the shape of a cyclone with the pipe 13 connected to the shaft through a tangential opening. The volume of the top section is such that the speed of the gas therethrough is reduced and the tubular partition 27 is employed to permit the introduction of the nodules with as little of the material carried off in the gas stream as possible. If desired, the top section 11a may be of such dimensions that the speed of gas flow through it is so low that practically no particles are carried away by the gas.

The intermittent checking or retarding of the downward flow of particles through the shaft 11 may be accomplished mechanically, rather than by varying the rate of gas flow and, for this purpose, the shaft 29 may be of plain cylindrical construction and provided with diametrically extending rods 30 having their ends mounted in the walls of the shaft. The rods are spaced lengthwise of the shaft and successive rods are angularly offset, so that the ends of the rods lie in two helices. When the rods are used, the upward flow of gas is substantially uniform, but the downwardly moving particles are rapidly arrested by striking the rods. The rods may be formed, if desired, to cause a rotary movement of the gas flowing upward through them, or may be provided with inclined blades for the purpose. Also, the rods may be replaced by chains.

The plant illustrated in Fig. 4 is one, in which raw material to be burnt is formed into nodules, which are preheated by the method of the invention. The raw material employed in the plant may be a wet slurry supplied through pipe 31 to the nodulizing drum 32 and the nodules produced in the drum are transported by conveying apparatus 33 and discharged into the top of shaft 11', which is the same in construction as the shaft 11. The nodules traveling down through shaft 11' and preheated therein flow through the connection 19' into the kiln 34. The gases from the kiln enter shaft 11' through the connection 19' and travel upwardly to escape through the pipe 35 leading to the cyclone 36. Solids separated from the gases in the cyclone are led by a pipe 37 to a pipe 38 leading into drum 32. The gases leaving cyclone 36 enter dust filters 39 and the dust recovered from the gases is led from the filters through pipes 40 into pipe 38. The solids recovered from the cyclone and from the dust filters are thus combined with the slurry to be nodulized therewith. The gases from the dust filters are conducted by pipe 41 to stack 42.

The amount of moisture in the wet slurry required as feed by the nodulizing apparatus 32 may be such that the addition thereto of the dry material from the cyclone 36 and filters 39 will not reduce the moisture content of the slurry to that desired in the nodules. In that situation, a pipe 43 with an enlarged upturned intake 44 may be mounted to extend through one of the clean-out openings and lie with its intake in the path of the downwardly traveling nodules. A part of the nodules falling through the shaft enters pipe 44 and these nodules are raised by an elevator 45 and discharged into the drum.

I claim:

1. A method of exchanging heat between a finely divided solid material and a gas, which comprises maintaining a current of gas flowing upwardly substantially vertically, introducing the material into the current near its upper end at such a rate that the material falls by gravity through the current with its fall retarded substantially by the current only, and varying the rate of fall of the material by alternately dividing the current of gas into a plurality of separate small streams, combining the small streams into a single large stream, the velocity of the small streams being greater than that of the large stream, and restricting each large stream for a portion of its length to increase the velocity of its restricted portion.

2. The method of claim 1, in which the small streams are distributed in a series about and spaced from a common axis and the small streams are combined into a single stream flowing along the axis.

3. An apparatus for effecting heat exchange between a gas and a finely divided solid material, which comprises a vertical shaft, means for maintaining a current of gas flowing upwardly through the shaft, means for introducing the material into the current of gas near the upper end of the shaft, means for withdrawing the material from the lower portion of the shaft, and means for alternately increasing and decreasing the velocity of the gas current, said means including a plurality of transverse partitions defining spaces, through which the gas flows in a single stream, means in each space between a pair of partitions for restricting the current of gas flowing through the space and thereby increasing its velocity, each of the partitions having formed therethrough a plurality of passages of a total cross-sectional area less than that of a space, the spaces having a total height greater than that of the partitions.

4. The apparatus of claim 3, in which the restricting means is a partition intermediate the partitions defining the space and having a single axial opening for passage of gas.

5. The apparatus of claim 3, in which the partitions are so arranged that the gas flows between them in a single stream traveling along the axis of the shaft, and said plurality of passages are arranged in a series distributed about and spaced from the shaft axis.

References Cited in the file of this patent

UNITED STATES PATENTS

| | | |
|---|---|---|
| 2,125,263 | Ahlmann | Aug. 2, 1938 |
| 2,580,635 | Winter | Jan. 1, 1952 |
| 2,635,949 | Fenske et al. | Apr. 21, 1953 |
| 2,641,450 | Garbo | June 9, 1953 |
| 2,684,840 | Behme et al. | July 27, 1954 |

FOREIGN PATENTS

| | | |
|---|---|---|
| 552,963 | Germany | June 20, 1932 |